United States Patent [19]

Watson et al.

[11] Patent Number: 5,168,012

[45] Date of Patent: Dec. 1, 1992

[54] CARBON BLACK BEADS WITH LATEX ADDITIVE

[75] Inventors: James M. Watson; Rodney L. Taylor, both of Monroe, La.

[73] Assignee: Columbian Chemicals Company, Atlanta, Ga.

[21] Appl. No.: 695,808

[22] Filed: May 6, 1991

Related U.S. Application Data

[63] Continuation-in-part of Ser. No. 322,355, Mar. 13, 1989, abandoned.

[51] Int. Cl.$^5$ ................................................ C09C 1/48
[52] U.S. Cl. .................................... 428/408; 423/445
[58] Field of Search ........................ 524/471; 428/408; 423/445

[56] References Cited

U.S. PATENT DOCUMENTS 2,457,962  1/1949  Whaley ........................... 428/408

Primary Examiner—Joseph L. Schofer
Assistant Examiner—Tom Weber
Attorney, Agent, or Firm—Jones, Askew & Lunsford

[57] ABSTRACT

Carbon black beads are provided which generally comprise carbon black powder and an elastomer such as styrene butadiene rubber, butadiene rubber, natural rubber, nitrile rubber, or the like, in an amount between 0.5 and 5.0% by weight of the beaded carbon black. The carbon black beads are made by beading the carbon black powder with latex. The latex treated carbon black is readily handleable in bulk form, easily dispersible in elastomeric compositions, and imparts improved dynamic properties to elastomeric compositions.

10 Claims, 4 Drawing Sheets

CARBON BLACK BEADS WITH LATEX ADDITIVE

CROSS REFERENCE

This application is a continuation-in-part of application Ser. No. 07/322,355, filed Mar. 13, 1989, now abandoned.

TECHNICAL FIELD

The present invention generally relates to the production of beaded or pelleted carbon blacks, and more particularly relates to additives for beaded carbon blacks which affect the handling characteristics of the carbon blacks and the subsequent performance of those carbon blacks in elastomeric compositions.

BACKGROUND OF THE INVENTION

Carbon black is used in several applications, but is primarily used as a reinforcer for elastomeric compositions such as the rubber in tires. Carbon black which is appropriate for reinforcing rubber often has a very low bulk density. Low bulk density carbon black occupies a relatively large volume and is therefore difficult to ship in bulk form and handle when mixing with rubber. Accordingly, carbon black is beaded or pelletized to increase the bulk density of the carbon black and render the carbon black more readily handleable in bulk form.

One common method of beading carbon black is by feeding carbon black powder through a cylinder containing a rapidly rotating pin shaft. A liquid beading additive is normally added to the carbon black to promote the beading process and impart good handling characteristics to the carbon black powder as the powder passes through the beading apparatus. Normally the beaded carbon black is then dried in a rotary drier.

Most conventional bead additives are materials which carbonize during the drying of the carbon black beads. These conventional bead additives include substances such as lignosulfonates, molasses, sugars, and the like and are normally added to carbon blacks in a water solution. The carbonized bead additives tend to hinder the dispersion of carbon blacks in rubber compounds. Thus, the costs saved by the improved handling characteristics imparted by most conventional bead additives are somewhat offset by the additional energy costs necessary to effectively disperse the carbon blacks treated with conventional bead additives. Further, the carbonized bead additives tend to hinder the reinforcement properties of the treated carbon blacks in rubber.

Even after carbon black is beaded with conventional bead additives, fine carbon black agglomerates, called fines, may be generated from carbon black beads and become airborne during handling of the carbon black. This effect is often called dusting. Efforts have been made to solve this particular problem. U.S. Pat. No. 4,440,807 to Gunnell proposes a method for covering carbon black beads with a layer of rubber to prevent dusting. The carbon black bead disclosed in Gunnell is described as consisting essentially of a carbon black pellet core and a cover layer of rubber. In other words, the carbon black pellet or bead disclosed in Gunnell has a core of carbon black which is not coated with elastomer. Accordingly, although the carbon black bead disclosed in Gunnell may exhibit less dusting during handling, the core of the carbon black bead in Gunnell is the same as a conventional carbon black bead.

U.S. Pat. No. 4,569,834 to West et al. discloses a process for beading carbon black with polyalkene bead binder to improve the dispersion of the beads in rubber and other polymers such as polyethylene. Preferred pelletizing additives disclosed in West are substituted or unsubstituted polyalkenes such as surface-oxidized polyethylene. West specifically discloses the use of AC-69 polyethylene from Allied Chemical as a carbon black bead binder. AC-69 is a low-molecular weight material that is not a high polymer or an elastomer. AC-69 polyethylene is a waxy material that is substantially saturated and, as such, may be expected to give some benefits in mixing because of a lubricity effect, but such polyethylenes do not chemically interact with elastomers. In rubber tires containing carbon black, the chemical interaction between the carbon black and elastomer reinforces the elastomer and improves the performance of the tire. Thus, when mixed with elastomer as in a rubber tire, carbon black beads disclosed in West et al. can block reinforcement of the elastomer by the carbon black.

U.S. Pat. No. 2,457,962 to Whaley discloses methods of beading carbon black with latex as a wetting agent to improve the handling properties of the carbon black and dispersion of the carbon black in rubber. In one method disclosed in Whaley, carbon black beads are formed by wetting the carbon black with latex and then agitating the mixture in a conventional carbon black pelletizer. Whaley teaches that the rubber content of the latex beaded carbon black should range from five to twenty percent by weight of the beaded carbon black. Although the beaded carbon black in Whaley may be effective in improving the handling properties of the carbon black and the dispersion of the carbon black in elastomer, the relatively large proportions of rubber that Whaley teaches should be incorporated into the carbon black significantly increases the cost in producing the beaded carbon black. This increased cost is a substantial disadvantage in the production of beaded carbon black which is to be used to make tires because such beaded carbon black typically has a very low profit margin. In addition, and perhaps more importantly, commercially available latex has significant quantities of surfactants that end up in the beaded carbon black product and in the final products, such as automobile tires, into which the beaded carbon black is mixed. In sufficient quantities, such surfactants can impair the ability of the carbon black to reinforce rubber and can otherwise impart undesirable properties to rubber.

Accordingly, there is a need for an economical beaded carbon black that is readily handleable in bulk form, disperses well in rubber, and effectively reinforces rubber.

SUMMARY OF THE INVENTION

The present invention solves the above-described problems in the prior art by providing improved carbon black beads for use in reinforcing elastomeric compositions. The carbon black beads of the present invention comprise carbon black powder and an elastomer present only in an amount between 0.5 and 5% by weight of the beaded carbon black to provide improved dispersibility of the carbon black powder in the elastomeric compositions and, surprisingly, impart improved dynamic properties to the elastomeric compositions in which the carbon black beads are later incorporated. More specifically, the carbon black beads of the present invention include (1) carbon black powder, the carbon black powder including individual aggregates of carbon black particles, and (2) an elastomer present in the amount between 0.5 and 5% by weight of the beaded carbon black, the individual aggregates of carbon black particles associated with the elastomer so that the elastomer is distributed substantially throughout the beaded carbon black, the elastomer being present in an amount sufficient to provide improved dispersibility of the carbon black powder in the elastomeric compositions and impart improved dynamic properties to the elastomeric compositions.

The carbon black beads of the present invention are made by a process generally comprising the steps of (1) adding a latex comprising an elasotmer to a carbon black powder, the latex being added to the carbon black in an amount sufficient to form beaded carbon black comprising elastomer in an amount between 0.5 and 5% by weight of the beaded carbon black, and (2) beading the carbon black powder and the latex in a carbon black beading apparatus whereby the individual aggregates of carbon black particles become associated with latex and the elastomer is distributed substantially throughout the resulting beaded carbon black. The latex-treated carbon black beads are then preferably dried at a temperature sufficiently low to prevent decomposition of the elastomer.

The carbon black beads of the present invention preferably comprise elastomer in an amount from about 1 to about 3% by weight of the beaded carbon black, and most preferably comprise elastomer in the amount of about 2% by weight of the beaded carbon black.

The latex-treated carbon black beads of the present invention are readily handleable in bulk form and therefore may be transported easily and cost effectively. The improved dispersibility of the latex treated carbon black beads provides easier, quicker, and thus less costly production of elastomeric compositions which include carbon black as a reinforcer or pigment. Further, the improved dynamic properties which the latex treated carbon black imparts to elastomeric compositions results in improved reinforcement and performance of the elastomeric compositions in applications such as automobile tires. These results are particularly surprising in view of the relatively small amounts of elastomer that the present invention requires. The small amount of elastomer, 0.5 to 5% by weight, and preferably from about 1 to about 3% by weight, provides for economical production of latex beaded carbon black.

Therefore, an object of the present invention is to provide an improved beaded carbon black.

Another object of the present invention is to provide an improved method for making beaded carbon black.

Another object of the present invention is to provide a beaded carbon black which is readily handleable and easily dispersed in elastomeric compositions.

A further object of the present invention is to provide a beaded carbon black which imparts improved properties to elastomeric compositions.

A further object of the present invention is to provide a more economical beaded carbon black and method for making the same.

Other objects, features, and advantages will become apparent from reading the following specifications in conjunction with the accompanying drawings.

DETAILED DESCRIPTION OF PREFERRED EMBODIMENTS

Figure 1:
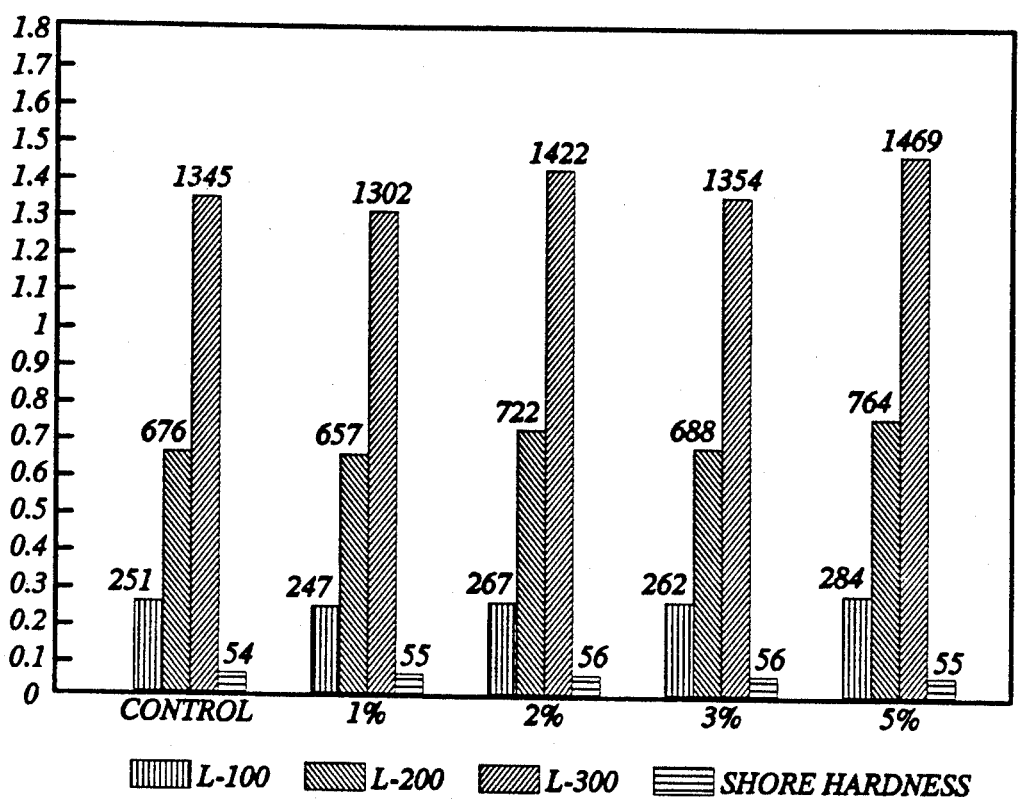
FIG. 1 is a graph comparing the physical properties of the tread samples from Examples 1-5.

The beaded carbon black of the present invention comprises elastomer in an amount between 0.5 and 5% by weight of the beaded carbon black. The individual aggregates of carbon black particles in the carbon black powder are associated with elastomer so that the elastomer is distributed substantially throughout the beaded carbon black.

The beaded carbon black of the present invention preferably comprises elastomer in an amount from about 1 to about 3% by weight of the beaded carbon black, and most preferably comprises elastomer in an amount of about 2% by weight of the beaded carbon black. The small amount of elastomer or latex necessary to practice the present invention are especially surprising and advantageous. Because only a small amount of elastomer or latex is necessary, the carbon black beads of the present invention may be economically produced.

The elastomer is preferably one which is compatible with the rubber tire formulations into which the beaded carbon black will be incorporated. Such elastomers include styrene butadiene rubber (hereinafter SBR), butadiene rubber, natural rubber, nitrile rubber, ethylenepropylene terpolymer (EPDM) and others.

The beaded carbon black of the present invention is preferably made as follows. A latex, comprising an elastomer, such as SBR or the like, suspended in water, is added to carbon black powder in sufficient quantity to form beaded carbon black comprising elastomer in an amount between 0.5 and 5% by weight of the beaded carbon black. The carbon black powder and latex is then beaded in a carbon black beading apparatus, such as a pin beader or the like. As a result, the individual aggregates of carbon black particles become associated with latex and the elastomer is distributed substantially throughout the resulting beaded carbon black. Additional distilled water may be added to the carbon black powder and latex to further promote the beading process. The beaded carbon black is then preferably dried in a conventional drying apparatus at temperatures sufficiently low so as not to decompose the elastomer. The dried latex treated carbon black beads are then ready for compounding into an elastomeric composition such as a rubber tire formulation. Most preferred latexes are latex grades 1027 and 7237 available from Goodyear Tire & Rubber Co.

Alternatively, the beaded carbon black of the present invention may be made by adding a solution of an elastomer in an organic solvent to carbon black powder, and then beading the carbon black powder and the elastomer solution. The organic solvent is then driven from the beaded carbon black under conditions which do not allow the organic solvent to combust.

The latex treated carbon black of the present invention provides improved dispersibility of the carbon black in elastomeric compositions. The latex treated carbon black disperses more easily and more quickly in elastomeric compositions than untreated carbon black beads or carbon blacks beaded with conventional bead binders such as calcium lignosulfonate or the like.

Surprisingly, the latex treated carbon black of the present invention also imparts improved dynamic properties to elastomeric compounds. Specifically, the latex treated carbon black imparts a higher elastic modulus to elastomeric compositions than untreated carbon blacks. The higher elastic modulus of the elastomeric composition indicates a higher dynamic stiffness. Automobile tires with treads made from elastomeric compositions having a higher elastic modulus tend to exhibit better handling and stability at high speeds and more regular treadwear.

In addition, the size of the treated carbon black beads is smaller when compared with untreated carbon black beads and carbon black beads formed with conventional bead binders. Further, the latex treated carbon black beads are stronger than untreated carbon black beads and are comparable in strength to carbon black beads formed from conventional bead binders. Accordingly, the latex treated carbon black beads are readily handleable in bulk form in addition to providing for improved dynamic performance of elastomeric compositions.

The present invention is further illustrated by Examples 1-9 below. Example 1 is a control example wherein no latex was added to the carbon black. Examples 5 and 9 illustrate carbon black beads including latex in an amount of 5% by weight which is the lower end of the range taught in U.S. Pat. No. 2,457,962. Examples 2-4 and 6-8 show certain embodiments designed to teach those of ordinary skill in the art how to practice this invention and represent the best mode contemplated for carrying out this invention.

EXAMPLES 1-9

Formation of the Beaded Carbon Black

In each of Examples 1-9, N299 carbon black from Columbian Chemicals Company, located in Atlanta, Georgia, was beaded in a pin beader with a bead additive. The beaded carbon black was then dried in a Blue M Friction Air oven. Table 1 shows the type of bead additive used and the amount of elastomer added to the carbon black to form the beads in Examples 1-9. The amount of elastomer latex solids is shown as % by weight of the beaded carbon black.

TABLE 1

| Example No. | Additive | % Solids Latex |
|---|---|---|
| 1 | Distilled water | 0 |
| 2 | Goodyear 1027 latex | 1 |
| 3 | Goodyear 1027 latex | 2 |
| 4 | Goodyear 1027 latex | 3 |
| 5 | Goodyear 1027 latex | 5 |
| 6 | Goodyear 7237 latex | 1 |
| 7 | Goodyear 7237 latex | 2 |
| 8 | Goodyear 7237 latex | 3 |

TABLE 1-continued

| Example No. | Additive | % Solids Latex |
|---|---|---|
| 9 | Goodyear 7237 latex | 5 |

Formation of the Sample Rubber Treads

In each of Examples 1-9, the beaded carbon black was then used to form rubber tread compounds having the formulation in Table 2. In Examples 2-9, the amount of elastomer used in the formulation was reduced to allow for the elastomer in the beaded carbon black. Thus, the tire tread formulation in each of Examples 1-9 contained the same amounts of carbon black and elastomer.

TABLE 2

| Tread Formulation | PHR |
|---|---|
| SBR 1712 (1) | 96 |
| BR 1207 (2) | 30 |
| Carbon Black | 70 |
| Circosol 4240 (3) | 14 |
| Zinc Oxide | 4 |
| Stearic Acid | 2 |
| Flexzone 7F (4) | 1.5 |
| Santocure MOR (5) | 1.2 |
| Sulfur | 1.8 |
| Total | 220.5 |

(1) Trade designation for styrene butadiene rubber from Goodyear Tire & Rubber Co.
(2) Trade designation for polybutadiene rubber from Goodyear Tire & Rubber Co.
(3) Trade designation for naphthenic oil from R. E. Carroll.
(4) Trade designation for antiozonant-antioxidant from Uniroyal Chemical.
(5) Trade designation for curing agent from Monsanto.

In each of Examples 1-9, the rubber tire tread formulation was made in a two-stage, Banbury/Mill, mixing process as follows:

The SBR 1712 and the BR 1207 were fed into a Banbury mixer operating at a temperature of 90°-100° F. and a speed of 116 rpm. One minute after the elastomers were fed to the Banbury, the beaded carbon black, zinc oxide, stearic acid, and FLEXONE 6H were added to the elastomers in the Banbury to form a masterbatch. 4.5 minutes after the elastomers were fed to the Banbury, CIRCOSOL 4240 was added to the masterbatch in the Banbury. 7.5 minutes after the elastomers were added to the Banbury, the masterbatch was removed from the Banbury. Then, the masterbatch was placed on a two roll mill set at a temperature of 190° F. The SANTOCURE MOR curing agent from Monsanto and sulfur were added to the masterbatch on the mill and the masterbatch was milled. One minute after the curing agent and sulfur were added, the milled sheet was cut 6 times on each side and the milling was continued. 3.5 minutes after the curing agent and sulfur were added, the masterbatch was periodically removed from the mill, rolled, and returned to the mill. 5.5 minutes after the curing agent and sulfur were added to the masterbatch, the masterbatch was finally removed from the mill.

Test Data

Samples of the masterbatches from Examples 1-9 were cured and subjected to various tests to compare effects of the latex treated carbon black and the untreated carbon black on the rubber formulation. The results of those tests are shown in Tables 1-6 and graphically shown in FIGS. 1-8.

(a) Physical and Rheometer Cure Properties.

In Table 3, the modulus, tensile strength, elongation, and rebound of cured samples from Examples 1–9, as determined by ASTM D-412, are shown. The modulus, tensile strength and elongation were all tested on samples which had been cured for 60 minutes at 293° C. The modulus is a measure of the energy it takes to stretch the sample a percentage of a predetermined length. The modulus of the sample was tested at stretches of 100, 200, and 300% as shown in Table 3. The tensile strength is the energy required to stretch the samples to the breaking point and the elongation is the % stretch of the samples at the breaking point. The rebound was twice tested according to ASTM D-1054, first according to the Goodyear-Healey method and second according to the Zwich method, each time on samples which were cured for 100 minutes at 293° C. The rebound is a measure of the resilience of the sample. The shore hardness as measured according to ASTM D-2240 is also shown in Table 1 and is a measure of the penetration hardness of the sample. The dispersion index (DI), as measured according to the method disclosed in "Quantitative Carbon Black Dispersion Analysis," ELASTOMER-ICS, Vol. 112, No. 1 (1980), is also shown in Table 3. The dispersion index is a measure of the degree of dispersion of the carbon black particles throughout the samples. In addition, the bound rubber, as measured according to the method disclosed in RUBBER CHEMISTRY AND TECHNOLOGY, Vol. 58, No. 2, p. 350 (1985), is shown in Table 3. The bound rubber is a measure of the amount of rubber bonded to the carbon black. The HBU is a measure of the hysteresis characteristics and was determined according to ASTM D-623.

Table 3 also shows the rheometer cure properties of samples from Examples 1–9, measured according to ASTM D-2084. Generally described, the rheometer cure properties were tested by placing a sample of the uncured masterbatches from Examples 1–9 in a rheometer having a rotating disk and curing the samples in the rheometer. The torque exerted on the rotating disk by the curing samples was then measured.

Figure 5:
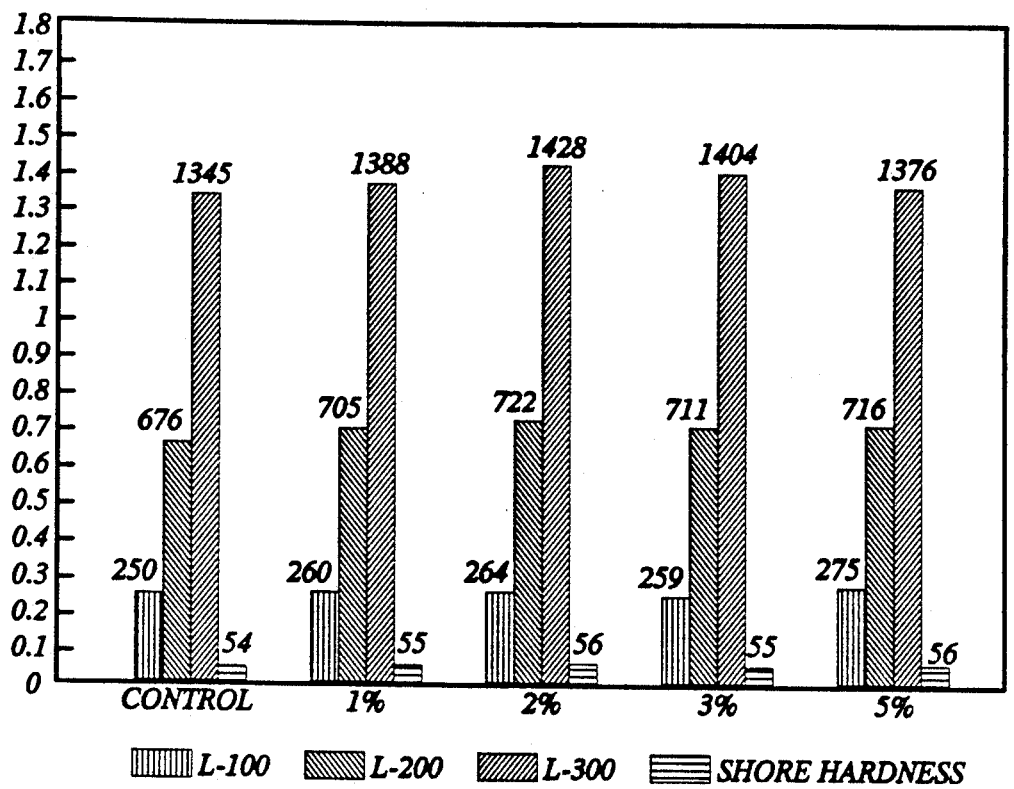
FIG. 5 is a graph comparing the physical properties of the tread samples from Examples 1 and 6-9.

The physical properties and the rheometer cure properties of the samples from Examples 1–9 shown in Table 3 were not significantly affected by the addition of latex to the carbon black during the beading process. The data in Table 1 shows that the physical and rheometer cure properties of tread formulations made with latex-treated carbon black are comparable to tread samples made with untreated carbon black. FIGS. 1 and 5 illustrate this with respect to the modulus and shore hardness values.

TABLE 3

| | Control | 1027 Latex | | | | 7237 Latex | | | |
|---|---|---|---|---|---|---|---|---|---|
| | 0% Ex. 1 | 1% Ex. 2 | 2% Ex. 3 | 3% Ex. 4 | 5% Ex. 5 | 1% Ex. 6 | 2% Ex. 7 | 3% Ex. 8 | 5% Ex. 9 |
| | Physical Properties | | | | | | | | |
| L-100, psi | 251 | 247 | 267 | 262 | 284 | 260 | 264 | 259 | 275 |
| L-200, psi | 676 | 657 | 722 | 688 | 764 | 705 | 722 | 711 | 716 |
| L-300, psi | 1345 | 1302 | 1422 | 1354 | 1469 | 1388 | 1428 | 1404 | 1376 |
| Tensile, psi | 2900 | 2903 | 2952 | 2929 | 2923 | 2984 | 2914 | 2911 | 2815 |
| Elongation, % | 543 | 561 | 540 | 552 | 527 | 549 | 528 | 533 | 532 |
| Shore Hardness | 54 | 55 | 56 | 56 | 55 | 55 | 56 | 55 | 56 |
| DI | 97.5 | 97.9 | 98.6 | 98.4 | 98.1 | 99.1 | 98.2 | 98.2 | 96.1 |
| Gdyr. Rebd., % | 55.4 | 54.9 | 54.4 | 55.4 | 54.9 | 55.4 | 54.9 | 56.4 | 54.9 |
| Zwick Rebd., % | 49.4 | 48.6 | 48.4 | 47.0 | 48.2 | 48.8 | 48.8 | 48.8 | 47.8 |
| % Bound Rubber | 38.7 | 37.4 | 38.7 | 36.5 | 37.9 | 36.8 | 38.0 | 36.7 | 35.8 |
| Gdyr. HBU, °C. | 60.3 | 62.5 | 62.2 | 61.1 | 61.9 | 62.5 | 60.8 | 63.1 | |
| | Rheometer Cure Data, Method C @ 325° F. | | | | | | | | |
| MH, in-lb | 25.0 | 25.6 | 25.6 | 25.5 | 25.8 | 25.1 | 25.3 | 24.9 | 25.3 |
| ML, in-lb | 5.8 | 6.0 | 6.0 | 6.0 | 6.1 | 6.0 | 6.0 | 6.0 | 6.1 |
| Net, in-lb | 19.2 | 19.6 | 19.6 | 19.5 | 19.7 | 19.1 | 19.3 | 18.9 | 19.2 |
| 1.0 in-lb Rise* | 5.2 | 5.1 | 5.0 | 5.1 | 5.1 | 5.0 | 5.0 | 5.2 | 5.1 |
| 90% Net. min. | 13.6 | 13.3 | 13.5 | 13.4 | 13.3 | 13.1 | 13.4 | 13.6 | 13.9 |

*min.

(b) Dynamic Properties.

Table 4 shows the dynamic properties of cured masterbatch samples from Examples 1–9 measured according to the method disclosed in "The Effects of Carbon Black on Rubber Hysteresis," RUBBER CHEMISTRY & TECHNOLOGY, Vol. 47, No. 4, p. 729 (1974). The dynamic properties were measured in compression at 14.5% mean strain, 0° C., 10 Hz and a 7.5% peak-to-peak strain amplitude. Generally, the dynamic properties were tested by subjecting a cylinder of the cured samples to a cyclic stress using the mean strain load as the center point. E' refers to the elastic modulus which is calculated in MPa and is a measure of the ability of the elastomeric composition to store or transfer energy. A higher elastic modulus indicates a more stiff elastomeric composition. E" refers to the loss modulus which is also measured in MPa and reflects the ability of a compound to absorb mechanical energy and convert that energy to heat. A higher loss modulus indicates an elastomeric composition with high heat buildup or hysteresis. Tan delta is the ratio of E"/E'. A higher tan delta also indicates an elastomeric composition with a high hysteresis. E* is referred to as the complex modulus and reflects both the elastic modulus and the loss modulus of a compound. E* equals $[(E")^2+(E')^2]^{\frac{1}{2}}$. D" is the loss compliance and is a measure of hysteresis at constant load. D" equals the ratio of $E"/(E^*)^2$ or Tan Delta/E'.

Figure 2:
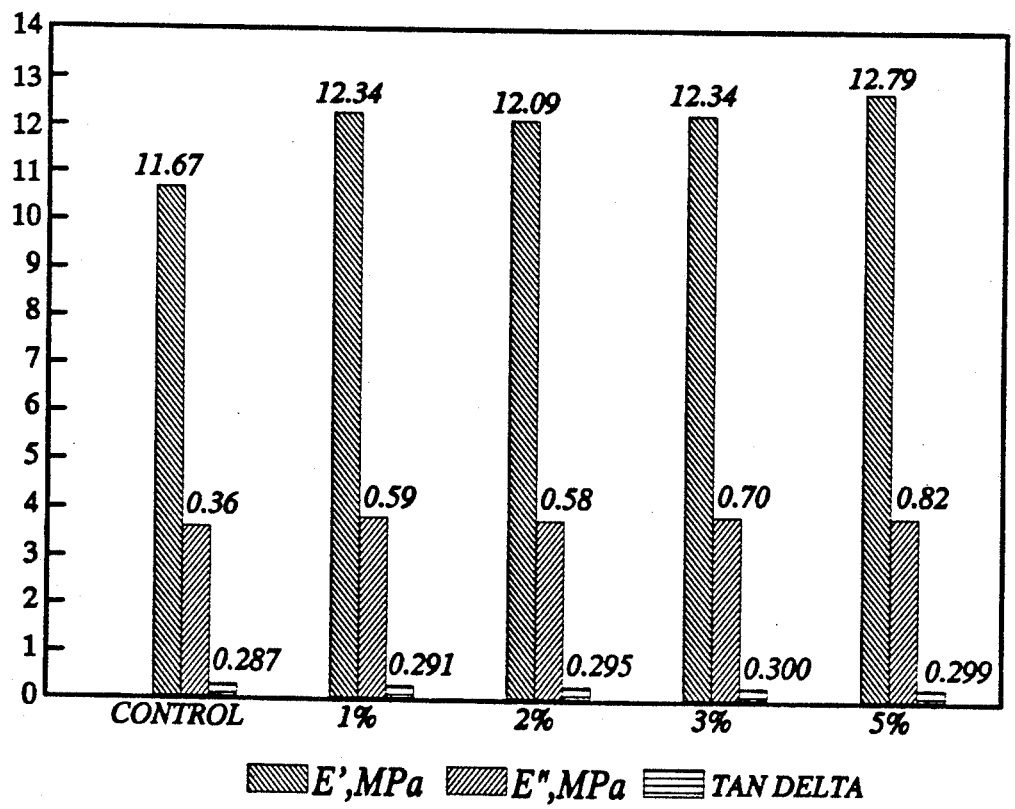
FIG. 2 is a graph comparing the dynamic properties of the tread samples from Examples 1-5.
Figure 6:
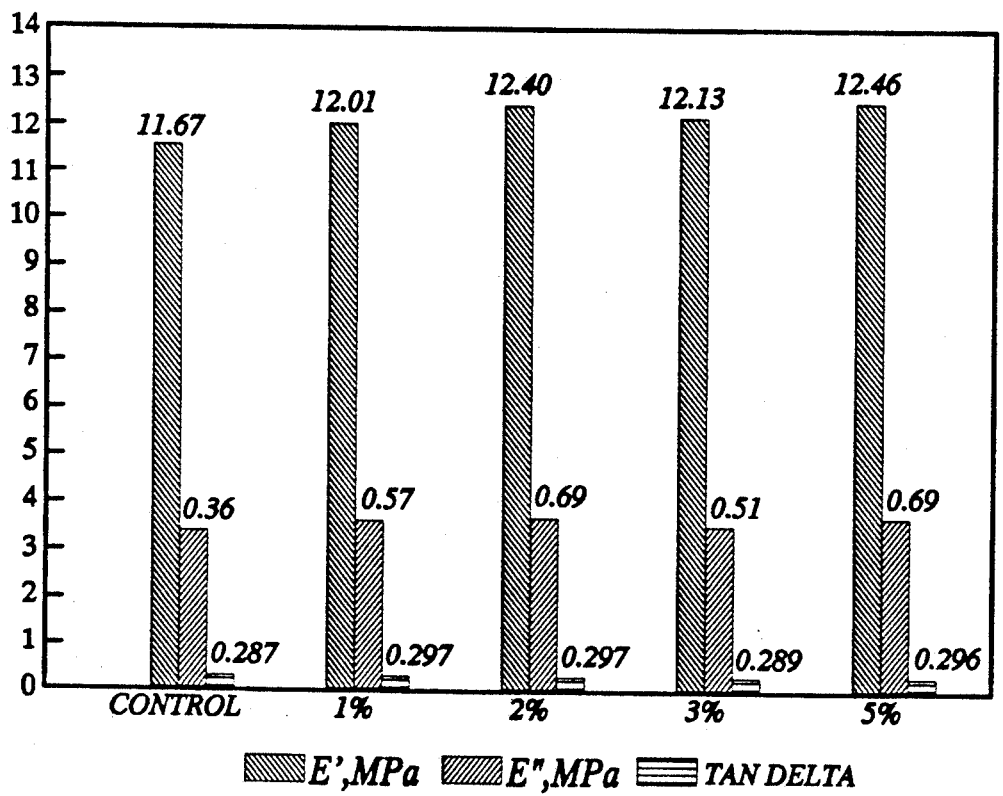
FIG. 6 is a graph comparing dynamic properties of the tread samples from Examples 1 and 6-9.

As can be seen from Table 4 and FIGS. 2 and 6, the use of the latex beaded carbon black in Examples 2–9 significantly increase the dynamic properties of the cured masterbatches from those examples relative to the untreated carbon black in Example 1. The increase in the elastic modulus of masterbatches having the latex treated carbon blacks indicates an increased stiffness in those masterbatches relative to the masterbatch having the untreated carbon black. Accordingly, the latex treated carbon black could be used to form an automobile tire having treads with a relatively high dynamic stiffness which would enhance the handling and stability of the tire at high speeds and promote more regular treadwear.

(d) Mini-Mixer Characteristics.

The mixing energy exerted by the Brabender mini-mixer while mixing the masterbatches in Examples 1–9 was monitored. The point at which the carbon black beads have been incorporated into the masterbatch is the black incorporation time (B.I.T) and the energy required to incorporate the carbon black into the masterbatch is the B.I.T. energy. The energy required to complete mixing of the masterbatch is referred to as the total mixing energy.

Figure 4:
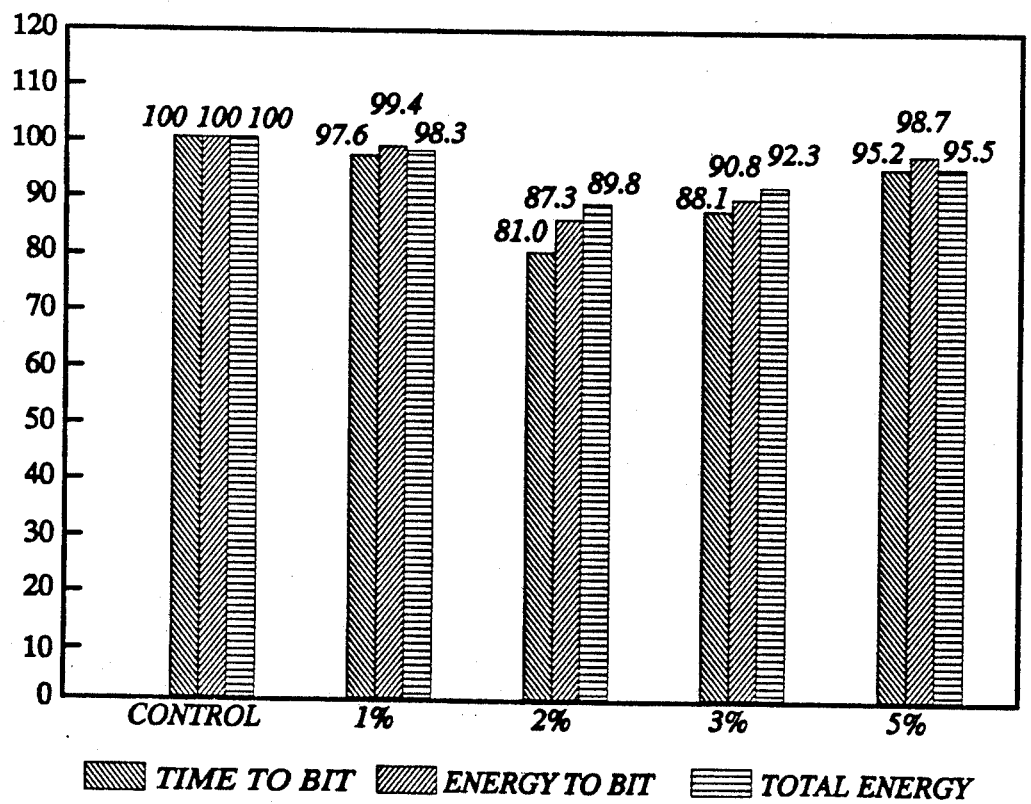
FIG. 4 is a graph comparing the mini-mixer mixing characteristics of the tread formulations used in Examples 1-5.
Figure 8:
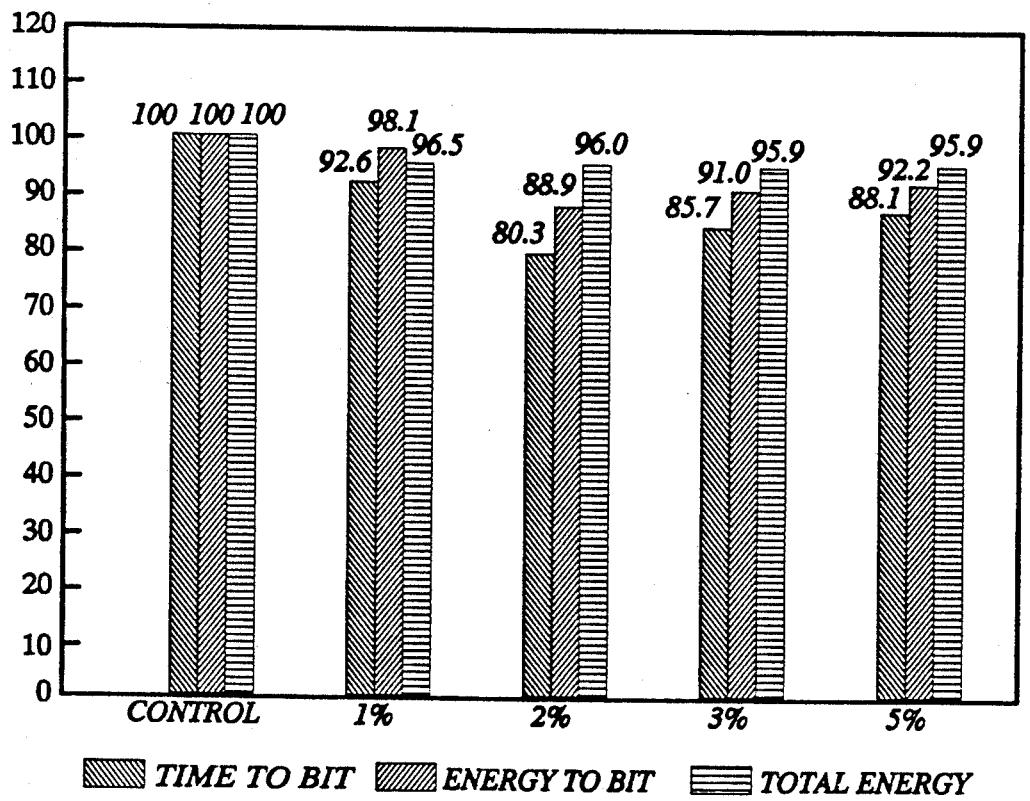
FIG. 8 is a graph comparing the mini-mixer mixing characteristics of the formulations used in the tread samples in Examples 1 and 6-9.

The B.I.T., B.I.T. energy, and the total mixing energy of the masterbatches from Examples 1–9 are all shown in Table 6 and FIGS. 4 and 8. The masterbatches from Examples 2–9 having the latex treated carbon black exhibited significantly lower B.I.T., B.I.T. energy and total mixing energy than the masterbatch from Example 1 having the untreated carbon black. Accordingly, the data in Table 6 indicates that carbon black beads treated with latex are more easily and quickly incorporated into elastomeric compositions. As can be seen from FIGS. 4 and 8, the mixing characteristics of the beaded carbon black having elastomer present in an amount from about 1 to about 3% by weight of the beaded carbon black were more favorable, and the carbon black beads from Examples 3 and 7 having elastomer present in an amount of about 2% by weight of the beaded carbon black showed the most favorable mixing characteristics.

TABLE 4

| | Control | Dynamic Properties | | | | | | | |
|---|---|---|---|---|---|---|---|---|---|
| | | 1027 Latex | | | | 7237 Latex | | | |
| | 0% Ex. 1 | 1% Ex. 2 | 2% Ex. 3 | 3% Ex. 4 | 5% Ex. 5 | 1% Ex. 6 | 2% Ex. 7 | 3% Ex. 8 | 5% Ex. 9 |
| E', MPa | 11.67 | 12.34 | 12.09 | 12.34 | 12.79 | 12.01 | 12.40 | 12.13 | 12.46 |
| E", MPa | 3.36 | 3.59 | 3.56 | 3.70 | 3.82 | 3.57 | 3.69 | 3.51 | 3.69 |
| E*, MPa | 12.15 | 12.85 | 12.61 | 12.88 | 13.32 | 12.53 | 12.94 | 12.63 | 12.99 |
| D", MPa[1] | .023 | .022 | .022 | .022 | .023 | .022 | .022 | .022 | .022 |
| Tan Delta | .287 | .291 | .295 | .300 | .299 | .297 | .297 | .289 | .296 |

(c) Colloidal Properties of Carbon Black Beads.

The colloidal properties of the carbon black beads used in Examples 1–9 were tested and the results are shown in Table 5. The 14M crushing strength was determined according to ASTM D-3313, the % fines was determined according to ADTM D-1508, and the bead size distribution was determined according to ASTM D-1511.

Figure 3:
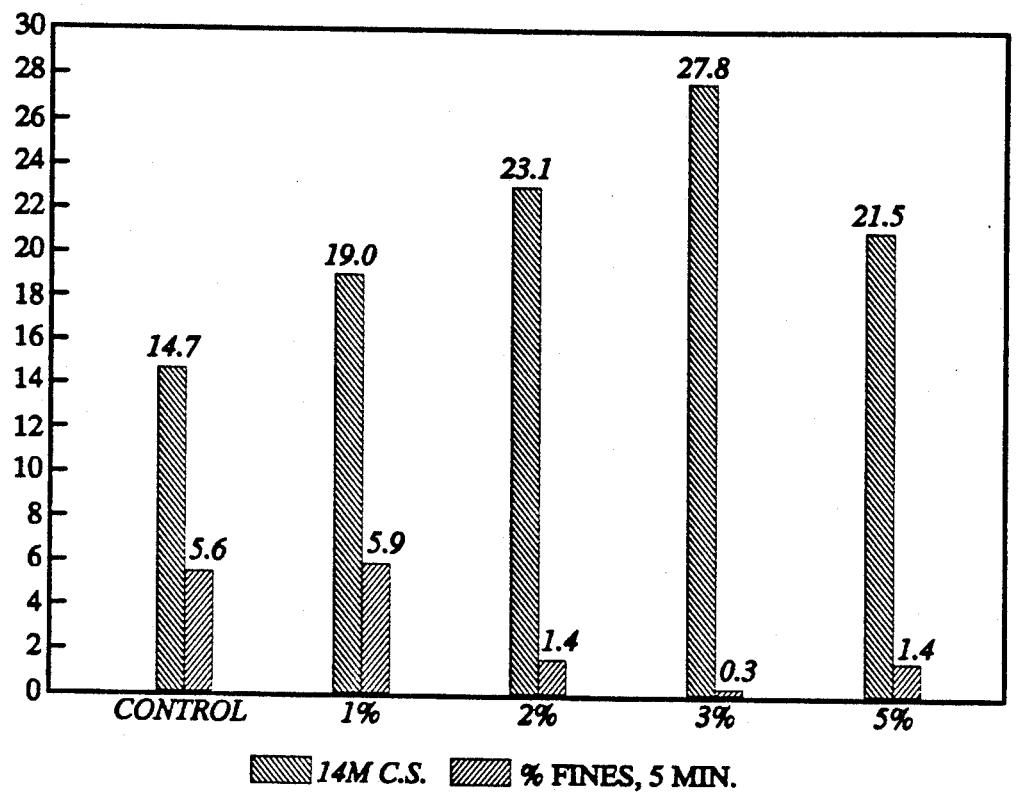
FIG. 3 is a graph comparing the properties of the carbon black beads used in the tread samples in Examples 1-5.
Figure 7:
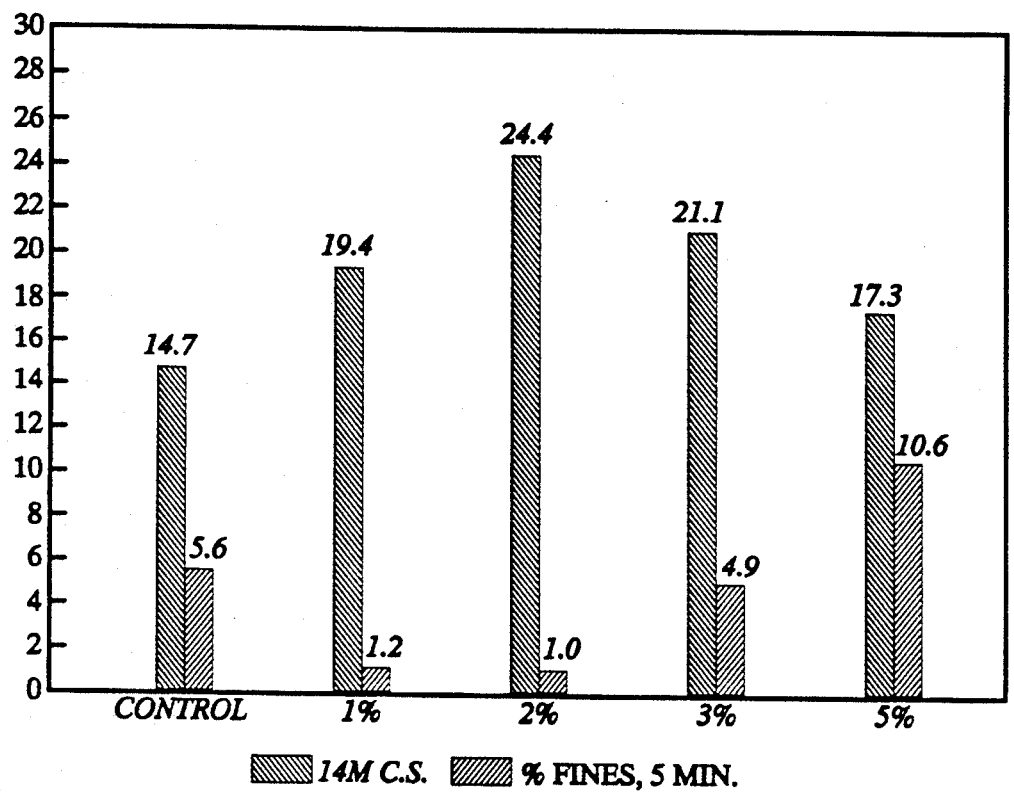
FIG. 7 is a graph comparing the properties of the carbon black beads used to make the tread samples in Examples 1 and 6-9.

As shown in Table 5 and FIGS. 3 and 7, the addition of latex to the carbon blacks used in Examples 2–9 increase the strength of the carbon black beads relative to the untreated carbon black beads from Example 1. The increase in bead strength is particularly noticeable in the samples wherein 1 to 3% elastomer was added to form the carbon black beads. In addition, Table 5 and FIGS. 3 and 7 show that the use of latex as a bead additive in appropriate proportions reduces the percent fines of the beaded carbon black relative to untreated carbon black. Table 5 also shows that the addition of latex as a bead additive broadens the bead size distribution of carbon black. From the data in Table 5 and the graphs shown in FIGS. 3 and 7, it can be surmised that the best combination of bead properties is obtained when latex is added to the carbon black in an amount from about 1 to about 3% by weight of the beaded carbon black.

TABLE 5

| | Bead Properties | | | | | | | | |
|---|---|---|---|---|---|---|---|---|---|
| | Control | 1027 Latex | | | | 7237 Latex | | | |
| | 0% Ex. 1 | 1% Ex. 2 | 2% Ex. 3 | 3% Ex. 4 | 5% Ex. 5 | 1% Ex. 6 | 2% Ex. 7 | 3% Ex. 8 | 5% Ex. 9 |
| 14 Mesh Crushing Strength % | | | | | | | | | |
| Avg. | 14.7 | 19.0 | 23.1 | 27.8 | 21.5 | 19.4 | 24.4 | 21.1 | 17.3 |
| Max. | 24.5 | 31.2 | 39.3 | 37.1 | 29.4 | 30.0 | 33.8 | 33.7 | 33.9 |
| Min | 8.4 | 11.5 | 11.1 | 11.2 | 10.1 | 8.9 | 11.9 | 12.0 | 10.1 |
| RH | 60 | 60 | 60 | 60 | 60 | 60 | 60 | 60 | 60 |
| % Fines, % | | | | | | | | | |
| 5 min. | 5.6 | 5.9 | 1.4 | 0.3 | 1.4 | 1.2 | 1.0 | 4.9 | 10.6 |
| 20 min. | 6.6 | 14.1 | 3.4 | 1.5 | 3.4 | 4.1 | 1.9 | 6.8 | 13.2 |
| Bead Size Distribution, % | | | | | | | | | |
| +10 | 40.0 | 49.6 | 28.8 | 23.0 | 9.4 | 41.2 | 34.8 | 5.8 | 8.6 |
| +18 | 44.0 | 40.7 | 41.9 | 49.3 | 26.8 | 41.4 | 43.8 | 22.5 | 20.1 |
| +35 | 13.9 | 6.7 | 17.1 | 23.2 | 30.0 | 15.5 | 17.3 | 29.8 | 33.7 |
| +60 | 1.4 | 1.2 | 1.7 | 3.9 | 18.2 | 1.4 | 3.5 | 20.0 | 17.2 |
| +120 | .3 | .8 | .3 | .4 | 14.2 | .3 | .4 | 17.2 | 13.3 |
| −120 | .4 | 1.0 | .2 | .2 | 1.4 | .2 | .2 | 4.7 | 7.1 |

TABLE 6

| | Bead Properties | | | | | | | | |
|---|---|---|---|---|---|---|---|---|---|
| | Control | 1027 Latex | | | | 7237 Latex | | | |
| | 0% Ex. 1 | 1% Ex. 2 | 2% Ex. 3 | 3% Ex. 4 | 5% Ex. 5 | 1% Ex. 6 | 2% Ex. 7 | 3% Ex. 8 | 5% Ex. 9 |
| Time to BIT (sec) | 84 | 82 | 68 | 74 | 80 | 78 | 70 | 72 | 74 |
| % of Control | 100 | 97.6 | 81.0 | 88.1 | 95.2 | 92.9 | 83.3 | 85.7 | 88.1 |

TABLE 6-continued

|  | Control | Bead Properties | | | | | | | |
|---|---|---|---|---|---|---|---|---|---|
|  |  | 1027 Latex | | | | 7237 Latex | | | |
|  | 0% Ex. 1 | 1% Ex. 2 | 2% Ex. 3 | 3% Ex. 4 | 5% Ex. 5 | 1% Ex. 6 | 2% Ex. 7 | 3% Ex. 8 | 5% Ex. 9 |
| Energy to BIT (E3 mg) | 14651 | 15469 | 12796 | 13300 | 14460 | 14378 | 13029 | 13329 | 13507 |
| % of Control | 100 | 99.4 | 87.3 | 90.8 | 98.7 | 98.1 | 88.9 | 91.0 | 92.2 |
| Total Energy (E3 mg) | 54751 | 53840 | 49141 | 50514 | 52285 | 52829 | 52545 | 52492 | 52488 |
| % of Control | 100 | 98.3 | 89.8 | 92.3 | 95.5 | 96.5 | 96.0 | 95.9 | 95.9 |

The foregoing description relates only to preferred embodiments of the present invention, and numerous changes and modifications therein may be made without departing from the spirit and scope of the invention as defined in the following claims:

We claim:

1. Beaded carbon black for use in reinforcing elastomeric compositions, the beaded carbon black comprising:
   carbon black powder, the carbon black powder comprising individual aggregates of carbon black particles; and
   an elastomer present in an amount between 0.5, inclusive, and 3%, exclusive, by weight of the beaded carbon black, the individual aggregates of carbon black particles associated with the elastomer so that the elastomer is distributed substantially throughout the beaded carbon black, the elastomer being present in an amount sufficient to provide improved dispersibility of the carbon black powder in the elastomeric compositions and impart improved dynamic properties to the elastomeric compositions.

2. Beaded carbon black as in claim 1, wherein the elastomer is selected from the group consisting of styrene butadiene rubber, butadiene rubber, natural rubber, nitrile rubber, and ethylene-propylene terpolymer.

3. Beaded carbon black for use in reinforcing elastomeric compositions, the beaded carbon black comprising:
   carbon black powder, the carbon black powder comprising individual aggregates of carbon black particles; and
   an elastomer present in an amount from about 1 to about 3% by weight of the beaded carbon black, the individual aggregates of carbon black particles associated with the elastomer so that the elastomer is distributed substantially throughout the beaded carbon black, the elastomer being present in an amount sufficient to provide improved dispersibility of the carbon black powder in the elastomeric compositions and impart improved dynamic properties to the elastomeric compositions.

4. Beaded carbon black as in claim 3, wherein the elastomer is selected from the group consisting of styrene butadiene rubber, butadiene rubber, natural rubber, nitrile rubber, and ethylene-propylene terpolymer.

5. Beaded carbon black for use in reinforcing elastomeric compositions, the beaded carbon black prepared by a process comprising the steps of:
   adding a latex comprising an elastomer to a carbon black powder comprising individual aggregates of carbon black particles, the latex being added to the carbon black powder in an amount sufficient to form beaded carbon black comprising elastomer in an amount between 0.5, inclusive, and 3%, exclusive by weight of the beaded carbon black; and
   beading the carbon black powder and the latex in a carbon black beading apparatus whereby the individual aggregates of carbon black particles become associated with the latex and the elastomer is distributed substantially throughout the resulting beaded carbon black,
   the latex being added to the carbon black powder in an amount sufficient to provide improved dispersibility of the carbon black powder in the elastomeric compositions and impart improved dynamic properties to the elastomeric compositions.

6. Beaded carbon black prepared by a process as in claim 5, wherein the elastomer in the latex added to the carbon black powder is selected from the group consisting of styrene butadiene rubber, butadiene rubber, natural rubber, nitrile rubber, and ethylene-propylene terpolymer.

7. Beaded carbon black prepared by a process as in claim 5, further comprising the step of drying the beaded carbon black at a temperature sufficiently low so as not to decompose the elastomer.

8. Beaded carbon black for use in reinforcing elastomeric compositions, the beaded carbon black prepared by a process comprising the steps of:
   adding a latex comprising an elastomer to a carbon black powder comprising individual aggregates of carbon black particles, the latex being added to the carbon black powder in an amount sufficient to form beaded carbon black comprising elastomer in an amount from about 1 to about 3% by weight of the beaded carbon black; and
   beading the carbon black powder and the latex in a carbon black beading apparatus whereby the individual aggregates of carbon black particles become associated with the latex and the elastomer is distributed substantially throughout the resulting beaded carbon black,
   the latex being added to the carbon black powder in an amount sufficient to provide improved dispersibility of the carbon black powder in the elastomeric compositions and impart improved dynamic properties to the elastomeric compositions.

9. Beaded carbon black prepared by a process as in claim 8, wherein the elastomer in the latex added to the carbon black powder is selected from the group consisting of styrene butadiene rubber, butadiene rubber, natural rubber, nitrile rubber, and ethylene-propylene terpolymer.

10. Beaded carbon black prepared by a process as in claim 8, further comprising the step of drying the beaded carbon black at a temperature sufficiently low so as not to decompose the elastomer.

* * * * *